W. B. BISBEE.
Weft-Fork.
No. 218,221.  Patented Aug. 5, 1879.
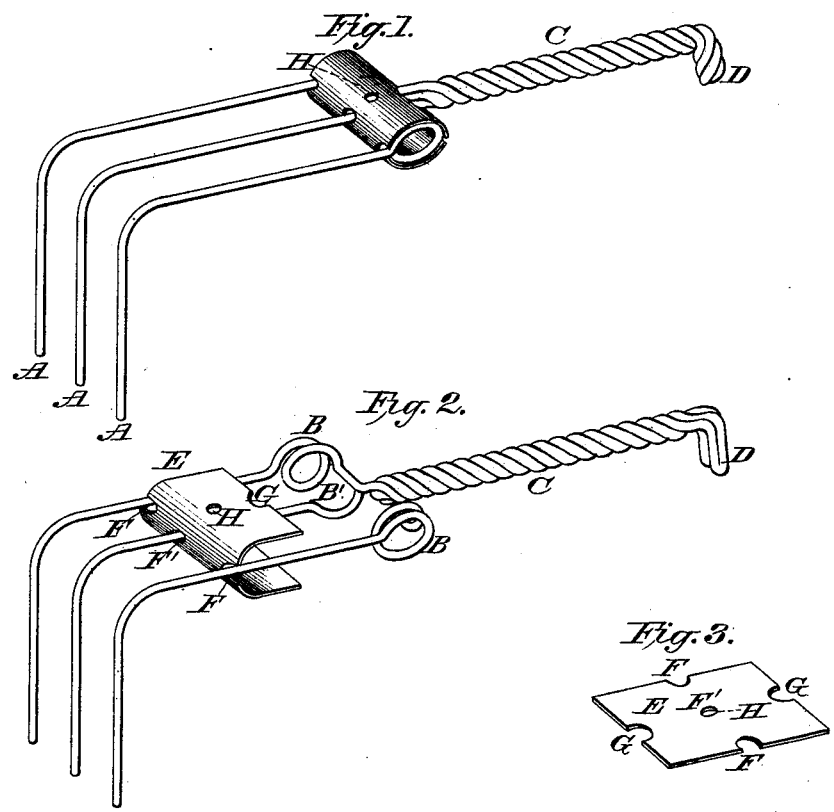

UNITED STATES PATENT OFFICE.

WISNER B. BISBEE, OF LOWELL, MASSACHUSETTS, ASSIGNOR OF ONE-HALF HIS RIGHT TO FREDERIC TAYLOR, OF SAME PLACE.

IMPROVEMENT IN WEFT-FORKS.

Specification forming part of Letters Patent No. 218,221, dated August 5, 1879; application filed October 27, 1877.

*To all whom it may concern:*

Be it known that I, WISNER B. BISBEE, of Lowell, in the county of Middlesex and Commonwealth of Massachusetts, have invented certain new and useful Improvements in Wire Stop-Motion Forks (otherwise called "weft-forks") for Looms, which improvements are fully set forth in the following specification, reference being had to the accompanying drawings.

My invention consists, first, in forming the shank of such fork by twisting together wires, the ends of which form the tines of the fork; second, in tinning said twisted wires together; third, in having said shank and tines rigidly connected with each other, and in having the bearing-loops separated from each other by intervals; fourth, in having said shank formed of wires twisted together, and in having said bearing-loops separated from each other by intervals; fifth, in having said shank formed of wires twisted and tinned together, and in having said bearing-loops separated from each other by intervals; sixth, in combining with said fork a metallic plate or protector, which surrounds said bearing-loops; and, seventh, in combining with said bearing-loops, separated by intervals, said protector, the latter being provided with an oil-hole, all as and for the purposes hereinafter specified.

Figure 1 is an oblique view of one form of said fork. Fig. 2 is an oblique view of a modified form of the fork, the protector being partly removed to show the bearing-loops. Fig. 3 is a view of the protector-plate.

A A A represent the tines; B B, the bearing-loops; B', the half-loop between said bearing-loops; C, the shank; D, the hook which, by engaging with well-known mechanism, releases the shipper to stop the loom when the weft or filling thread breaks; E, a metallic plate, which serves as a bearing-protector, and has indentations F F at its sides and a hole, F', in the middle to admit the tines, and which, also, has semicircular indentations G G at its top and bottom edges to admit the shank of the fork, so that these edges of the protector may be brought together around the bearing-loops; and H is an oil-hole in the protector-plate, through which the bearing is lubricated.

To form my fork (see Fig. 2) I take two wires of sufficient length and bend each wire back upon itself, and then bend down the doubled ends of said wires at right angles to form the hook D, and then twist together the doubled wires to form the shank C. I then bend three of the four single wires at the other end of the shank from the hook at right angles to the shank, so that one of the wires is parallel to the hook D, and on the same side of the shank and at right angles to the other two bent wires, which extend in opposite directions from the shank. I then cut off the fourth wire. I then bend the wire which is parallel to said hook half around a spindle to make the half-loop B'. I then bend the two remaining wires parallel to said hook, but in the opposite direction from the shank, and at such a distance from the shank as I desire the bearing-loops to be. The bearing-loops B B, I form in the usual manner by winding them about a spindle. The tines are also formed in the usual manner. A metallic plate or sheet, E, (see Fig. 3,) preferably of tin-plate, is then passed over the tines by means of the indentations F F and hole F' up to the loops B B B', and bent around said loops until the edges of said plate are brought together, the indentations G G admitting the shank C. Last of all the fork is dipped in melted tin, (after being cleaned by acid or otherwise,) and the joints and contiguous surfaces are thereby united or soldered, and the fork is covered with a smooth surface.

In this fork the shank is very strong and of equal strength in all directions, whereas other wire stop-motion forks are weakest vertically through the shank, where the greatest strength is required, owing to the nature of the strain to which such forks are subjected.

By separating the bearing-loops from each other, different sizes of wire may be used, as required, without altering the width of the bearing, whereas if the bearing were a continuous helix we should be confined to certain arbitrary widths—that is, to such widths as are divisible by the diameter of the wire used without a remainder—and a change of fork would require ordinarily a change of the fork-holder.

The protector E is an inexpensive but efficient means of preventing the bearing-loops and tines from spreading apart or crowding together.

The spaces between the loops at the bottom of the protector are receptacles for oil. The separation of the loops from each other allows the oil to be introduced through an oil-hole in the top of the protector, and the half-loop, being at the bottom, allows the oil-hole to be in the middle of the top of the protector.

By tinning the fork it is not only preserved from rust, but is greatly strengthened.

Instead of twisting together the doubled wires to form the shank, four single wires may be used, as shown in Fig. 1. Instead of tin, solder or other alloy or metal may be used.

I claim as my invention—

1. The stop-motion fork having its shank C formed of wires twisted together, as and for the purpose herein specified.

2. The stop-motion fork having its shank C formed of wires twisted together and tinned, as and for the purpose specified.

3. The wire stop-motion fork having its shank C and tines A A A rigidly connected with each other, and its bearing-loops B B separated from each other by intervals, as and for the purpose specified.

4. The stop-motion fork having its shank C formed of wires twisted together, and its bearing-loops B B separated from each other by intervals, as and for the purpose specified.

5. The stop-motion fork having its shank C formed of wires twisted and tinned together, and its bearing-loops B B separated from each other by intervals, as and for the purpose specified.

6. The stop-motion fork having its bearing-loops B B surrounded by the protector E, in combination with said protector, as and for the purpose specified.

7. The bearing-loops B B B', separated by intervals, in combination with the protector E, provided with the oil-hole H, as and for the purpose specified.

WISNER B. BISBEE.

Witnesses:
IRVING S. PORTER,
ALBERT M. MOORE.